United States Patent
Kumar Bhure et al.

(10) Patent No.: US 12,165,102 B2
(45) Date of Patent: Dec. 10, 2024

(54) SYSTEM AND METHOD OF ANOMALY DETECTION USING MACHINE LEARNING AND A LOCAL OUTLIER FACTOR

(71) Applicant: Blue Yonder Group, Inc., Scottsdale, AZ (US)

(72) Inventors: Swapnil Santosh Kumar Bhure, Bangalore (IN); Sunil Morajkar, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 18/526,716

(22) Filed: Dec. 1, 2023

(65) Prior Publication Data
US 2024/0104498 A1    Mar. 28, 2024

Related U.S. Application Data

(63) Continuation of application No. 16/744,522, filed on Jan. 16, 2020, now Pat. No. 11,868,957.

(60) Provisional application No. 62/835,321, filed on Apr. 17, 2019.

(51) Int. Cl.
*G06Q 10/087* (2023.01)
*G06Q 10/0633* (2023.01)

(52) U.S. Cl.
CPC ....... *G06Q 10/087* (2013.01); *G06Q 10/0633* (2013.01)

(58) Field of Classification Search
CPC .......................... G06Q 10/087; G06Q 10/0633
See application file for complete search history.

(56) References Cited

U.S. PATENT DOCUMENTS

| | | |
|---|---|---|
| 6,834,266 B2 | 12/2004 | Kumar et al. |
| 7,693,739 B2 | 4/2010 | Schmidtberg et al. |
| 8,015,080 B2 * | 9/2011 | Kerschbaum .......... G06N 3/126 370/242 |
| 10,642,652 B2 | 5/2020 | Nghiem |
| 11,250,343 B2 | 2/2022 | Rai et al. |

(Continued)

OTHER PUBLICATIONS

A. Aki, D. K. M. Reddy, Y. K. Reddy, C. R. Kavitha and T. Sasikala, "Analyzing the real time electricity data using data mining techniques," 2017 International Conference On Smart Technologies For Smart Nation (SmartTechCon), 2017, pp. 545-549, doi: 10.1109/SmartTechCon.2017.8358431, (Year: 2017).*

(Continued)

*Primary Examiner* — Michael Jared Walker
(74) *Attorney, Agent, or Firm* — Spencer Fane LLP; Steven J. Laureanti

(57) ABSTRACT

A system and method are disclosed to locate one or more data anomalies in a supply chain network comprising two or more supply chain entities. Embodiments receive supply chain data comprising a plurality of data points. Embodiments select categories and measures by which to cluster the supply chain data points. Embodiments cluster the data points into intersection clusters as measured by the selected categories and measures. Embodiments generate time interval clusters that divide the intersection clusters into one or more time intervals. Embodiments generate K-values for the plurality of data points in relation to the number of time interval clusters. Embodiments generate local outlier factors for the plurality of data points using the generated K-values.

20 Claims, 8 Drawing Sheets

(56) References Cited

U.S. PATENT DOCUMENTS

| | | | |
|---|---|---|---|
| 2003/0074251 A1* | 4/2003 | Kumar | G06Q 30/0204 |
| | | | 702/179 |
| 2005/0055287 A1* | 3/2005 | Schmidtberg | G06Q 10/063 |
| | | | 705/28 |
| 2015/0220874 A1* | 8/2015 | Woolsey | G06Q 10/087 |
| | | | 705/28 |
| 2017/0169447 A1* | 6/2017 | Hajian | H04L 51/08 |
| 2017/0220944 A1* | 8/2017 | Nghiem | G06F 9/5066 |
| 2018/0357556 A1* | 12/2018 | Rai | G06N 20/00 |

OTHER PUBLICATIONS https://ieeexplore.ieee.org/stamp/stamp.jsp?tp=&arnumber=8358431. (Year: 2017).*

Academic Paper.*

Breunig et al., "LOF: Identifying Density-Based Local Outliers"; Proc. ACM SIGMOD 2000 Int. Conf. on Management of Data, Dalles, TX, 2000; pp. 1-12 (Year: 2002).

MCL, "1D Clustering with KDE", May 12, 2017; mattoverby Blog post; 4 pages (Year: 2017).

Kodinariya et al., "Review on determining number of Cluster in K-Means Clustering" International Journal of Advance Research in Computer Science and Management Studies; vol. 1, Issue 6, Nov. 2013; ISSN: 2321-7782 (Online), p. 90-95 (Year: 2013).

Aki et al., "Analyzing the real time electricity data using data mining techniques," 2017 International Conference on Smart Technologies For Smart Nation (SmartTechCon), 2017, pp. 545-549, doi: 10.1109/smartTechCon.2017.8358431, (Year: 2017).

\* cited by examiner

| PAST PERIODS | | JAN'18 | | FEB'18 | | MAR'18 | | APR'18 | |
|---|---|---|---|---|---|---|---|---|---|
| ITEM | SITE | SELLER | BASELINES | PROMOTIONS | BASELINES | PROMOTIONS | BASELINES | PROMOTIONS | BASELINES | PROMOTIONS |
| ITEM 1 | SITE 1 | SELLER 1 | 93 | 87 | 105 | 101 | 104 | 109 | 78 | 65 |
| ITEM 2 | SITE 2 | SELLER 2 | 108 | 90 | 112 | 129 | 129 | 129 | 67 | 73 |
| ITEM 3 | SITE 3 | SELLER 3 | 109 | 114 | 121 | 109 | 109 | 100 | 75 | 80 |
| ITEM 4 | SITE 4 | SELLER 4 | 98 | 92 | 124 | 107 | 110 | 116 | 61 | 75 |
| ITEM 5 | SITE 5 | SELLER 5 | 118 | 93 | 130 | 121 | 106 | 109 | 71 | 69 |
| ITEM 6 | SITE 6 | SELLER 6 | 110 | 100 | 121 | 122 | 126 | 103 | 60 | 70 |
| ITEM 7 | SITE 7 | SELLER 7 | 91 | 96 | 122 | 113 | 113 | 110 | 79 | 71 |
| ITEM 8 | SITE 8 | SELLER 8 | 103 | 99 | 121 | 103 | 129 | 130 | 61 | 71 |
| ITEM 9 | SITE 9 | SELLER 9 | 100 | 97 | 101 | 109 | 123 | 100 | 67 | 79 |
| ITEM 10 | SITE 10 | SELLER 10 | 98 | 89 | 126 | 103 | 125 | 108 | 64 | 73 |
| ITEM 11 | SITE 11 | SELLER 11 | 105 | 94 | 130 | 118 | 106 | 124 | 60 | 61 |
| ITEM 12 | SITE 12 | SELLER 12 | 95 | 98 | 110 | 117 | 124 | 108 | 74 | 66 |
| ITEM 13 | SITE 13 | SELLER 13 | 84 | 93 | 103 | 118 | 119 | 124 | 67 | 72 |
| ITEM 14 | SITE 14 | SELLER 14 | 91 | 109 | 106 | 121 | 112 | 118 | 102 | 106 |
| ITEM 15 | SITE 15 | SELLER 15 | 73 | 105 | 120 | 109 | 126 | 127 | 109 | 127 |
| ITEM 16 | SITE 16 | SELLER 16 | 108 | 110 | 106 | 103 | 127 | 123 | 113 | 111 |
| ITEM 17 | SITE 17 | SELLER 17 | 108 | 103 | 114 | 106 | 116 | 127 | 117 | 130 |

FIG. 4

SYSTEM AND METHOD OF ANOMALY DETECTION USING MACHINE LEARNING AND A LOCAL OUTLIER FACTOR

CROSS-REFERENCE TO RELATED APPLICATIONS

This application is a continuation of U.S. patent application Ser. No. 16/744,522, filed Jan. 16, 2020, entitled "System and Method of Anomaly Detection using Machine Learning and a Local Outlier Factor," which claims the benefit under 35 U.S.C. § 119(e) to U.S. Provisional Application No. 62/835,321, filed Apr. 17, 2019, entitled "System and Method of Anomaly Detection using Machine Learning and a Local Outlier Factor." U.S. patent application Ser. No. 16/744,522 and U.S. Provisional Application No. 62/835,321 are assigned to the assignee of the present application.

TECHNICAL FIELD

The present disclosure relates generally to anomalous data detection and specifically to a system and method of detecting and removing faulty supply chain planning and execution systems data.

BACKGROUND

Supply chain networks and supply chain planning and execution systems may utilize data stored on different computing platforms and spread throughout the supply chain network. These planning and execution systems interact with millions of records of multidimensional data stored and distributed throughout the supply chain network. Problems with data integration, lack of unity in formatting practices, manual errors, and other discrepancy sources may create large quantities of faulty data, i.e. data anomalies, that do not reflect actual supply chain conditions, and which reduce the reliability, accuracy, and precision of supply chain plans, forecasts, and other conclusions based on the data. Static rules to identify faulty data may result in false negatives (failing to detect one or more actual data anomalies) or false positives (locating one or more valid data outliers that are not the product of faulty data and are mischaracterized as data anomalies), which may require a significant amount of undesirable effort expended to correct.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 4 illustrates a sales data display interface, according to embodiments;

DETAILED DESCRIPTION

Figure 1:
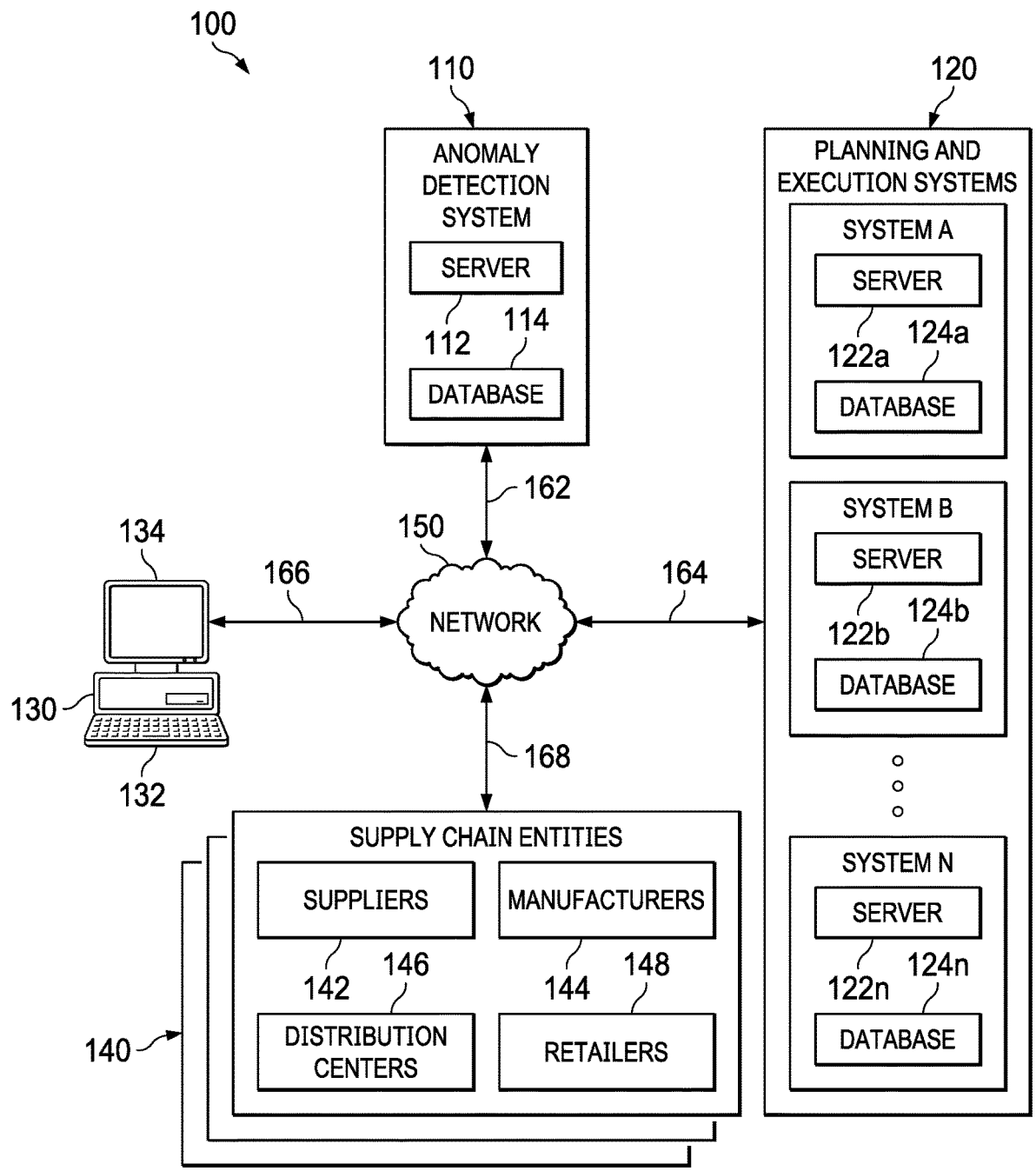
FIG. 1 illustrates an exemplary supply chain network, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, aspects of the following disclosure relate to a supply chain network anomaly detection system and method to locate one or more data anomalies automatically and efficiently. Embodiments utilize K-means clustering and local outlier factor analysis to detect valid data outliers and faulty data anomalies in supply chain data. Embodies generate a prioritized list of anomalies ranked by anomaly magnitude. Embodiments apply machine learning techniques to the outlier and anomaly detection process to improve the efficiency and accuracy with which the anomaly detection system locates anomalies and outliers, and to reduce the number of false negatives (failing to detect one or more actual data anomalies) or false positives (locating one or more valid data outliers that are not the product of faulty data and mischaracterizing the outliers as data anomalies) detected over time.

Embodiments of the following disclosure categorize valid data outliers and faulty data anomalies in past data (using sales data of transactions that previously took place over various time intervals) or future data (categorizing outliers and anomalies in supply chain plan outputs or sales forecasts for future time intervals). Over time, embodiments utilize machine learning techniques to categorize outliers and anomalies automatically with minimal user oversight, improving the speed and accuracy with which the anomaly detection system locates outliers and anomalies and reducing the resources required to do so.

FIG. 1 illustrates exemplary supply chain network 100, according to an embodiment. Supply chain network 100 comprises anomaly detection system 110, one or more planning and execution systems 120, computer 130, one or more supply chain entities 140, network 150, and one or more communication links 162-168. Although anomaly detection system 110, one or more planning and execution systems 120, computer 130, one or more supply chain entities 140, network 150, and communication links 162-168 are shown and described, embodiments contemplate any number of anomaly detection systems 110, planning and execution systems 120, computers 130, supply chain entities 140, networks 150, or communication links 162-168, according to particular needs.

In an embodiment, anomaly detection system 110 comprises server 112 and database 114. As described in more detail below, server 112 comprises one or more modules, engines, and execution logic that detect anomalous supply chain data, generate a prioritized list of supply chain anomalies, and categorize the anomalies as either valid data outliers that are not the product of faulty data or invalid data anomalies. According to embodiments, anomaly detection system 110 receives supply chain data from database 114 of one or more planning and execution system 120, supply chain entities 140, or one or more data storage locations local to, or remote from, supply chain network 100. Embodiments of anomaly detection system 110 contemplate processing, transforming, and normalizing the supply chain data to prepare the data for use with one or more machine learning models that detect abnormal behavior of data and suggest values for anomalies.

Anomalies may exist in past sales data and/or in future forecast data. In past data, anomaly detection system 110 may analyze data for consistency. Regarding future data, anomaly detection system 110 may improve supply chain plans or sales forecasts generated by supply chain planning and execution systems 120. By way of example only and not by way of limitation, in an embodiment, anomaly detection system 110 receives historical sales data from each of one or more supply chain planning and execution systems 120, each of which has differing data requirements and planning periods. Detecting data anomalies for this data is a tedious job of checking data at every step and identifying the data points which are faulty. Continuing the example, anomaly detection system 110 generates a final forecast for a product family at a future time period. The final forecast comprises demand variables which are either generated by algorithms or input manually, which is error-prone because this input comprises long time horizons without much clarity, which results in anomalies of the future data. These anomalies may be corrected by anomaly detection system 110 as illustrated below.

According to an embodiment, each of one or more planning and execution systems 120 comprise server 122 and database 124. As described above, supply chain planning and execution is typically performed by several distinct and dissimilar computing platforms and systems that execute one or more supply chain planning and execution processes including, for example, demand planning, production planning, supply planning, distribution planning, execution, transportation management, warehouse management, fulfillment, procurement, and the like. The one or more planning and execution systems 120 operate on one or more computers 130 that are integral to or separate from the hardware and/or software that support one or more supply chain entities 140. Server 122 of the one or more planning and execution systems 120 comprises one or more modules, such as, for example, a planning module, a solver, a modeler, and/or an engine, for performing actions of one or more planning and execution processes. Server 122 stores and retrieves supply chain data from database 124 or from one or more locations local to, or remote from, supply chain network 100.

For example, embodiments of supply chain network 100 contemplate one or more data warehouses that receives and stores archived enterprise data from the one or more planning and execution systems 120 and one or more supply chain entities 140. Embodiments contemplate any suitable number of servers 122 or databases 124 internal to or externally coupled with the data warehouse. Server 122 of the data warehouse may support one or more processes for receiving supply chain data from one or more supply chain planning and execution processes and one or more supply chain entities 140. Supply chain data may include, for example, sales data, forecast data, stock levels, safety stock levels, forecast production, logistics operations, such as, for example, the predicted time to ship a product from a first location to a second location, actual shipping times for past shipments, production plans, actual production, store data (including sales numbers (e.g. number of sales over the past week), the start level at the store, the quality of the forecasts for a store), transportation management system (TMS) data, warehouse management system (WMS) data, a fulfillment system data, a procurement system data, production system data, and the like.

As shown in FIG. 1, supply chain network 100 operates on one or more computers 130 that are integral to or separate from the hardware and/or software that support anomaly detection system 110, the one or more planning and execution systems 120, and one or more supply chain entities 140. Supply chain network 100 comprising anomaly detection system 110, the one or more planning and execution systems 120, and one or more supply chain entities 140 may operate on one or more computers 130 that are integral to or separate from the hardware and/or software that support anomaly detection system 110, the one or more planning and execution systems 120, and one or more supply chain entities 140. Computers 130 may include any suitable input device 132, such as a keypad, mouse, touch screen, microphone, or other device to input information. Computer 130 output device 134 may comprise a computer monitor and speakers to convey information associated with the operation of supply chain network 100, including digital or analog data, visual information, or audio information. Computer 130 may include fixed or removable computer-readable storage media, including a non-transitory computer-readable medium, magnetic computer disks, flash drives, CD-ROMs, in-memory devices, or other suitable media to receive output from and provide input to supply chain network 100.

Computer 130 may include one or more processors and associated memory to execute instructions and manipulate information according to the operation of supply chain network 100 and any of the methods described herein. In addition, or as an alternative, embodiments contemplate executing the instructions on computer 130 that cause computer 130 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from anomaly detection system 110, the one or more planning and execution systems 120, and one or more supply chain entities 140. In addition, each of the one or more computers 130 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with anomaly detection system 110, the one or more planning and execution systems 120, and one or more supply chain entities 140. These one or more users may include, for example, a "manager" or a "planner" handling detection of faulty and anomalous data, correction of values or categorization as an outlier data point, assessing the reliability, accuracy or precision of a forecast, plan, or other calculation, processing, transforming, and normalizing data, and and/or one or more related tasks within supply chain network 100. In addition, or as an alternative, these one or more users within supply chain network 100 may include, for example, one or more computers 130 programmed to handle autonomously, among other things, forecasting demand, supply and distribution planning, inventory management, allocation planning, order fulfilment, adjustment of manufacturing and inventory levels at various stocking points and distribution centers 146, and/or one or more related tasks within supply chain network 100.

One or more supply chain entities 140 represent one or more supply chain networks 100, including one or more enterprises, such as, for example, networks of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Suppliers 142 may comprise automated distribution systems that automatically transport products to one or more manufacturers 144 based, at least in part, on corrected supply chain forecasts, plans, or analyses based on a detected and corrected anomaly by anomaly detection system 110, and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery that produce products based, at least in part, on corrected supply chain forecasts, plans, or analyses based on a detected and corrected anomaly by anomaly detection system 110, and/or one or more other factors described herein.

Distribution centers 146 may be any suitable entity that offers to store or otherwise distribute at least one product to retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems that automatically remove products from and place products into inventory based, at least in part, on corrected supply chain forecasts, plans, or analyses based on a detected and corrected anomaly by anomaly detection system 110, and/or one or more other factors described herein.

Retailers 148 may be any suitable entity that obtains one or more products to sell to one or more customers. Retailers 148 may comprise any online or brick-and-mortar store, including stores with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 148 based on computer-generated instructions or automatically by machinery to place products in a desired location in retailers 148 and which may be based, at least in part, on corrected supply chain forecasts, plans, or analyses based on a detected and corrected anomaly by anomaly detection system 110, and/or one or more other factors described herein.

Although one or more supply chain entities 140 are shown and described as separate and distinct entities, the same entity may simultaneously act as any one of one or more supply chain entities 140. For example, one or more supply chain entities 140 acting as a manufacturer can produce a product, and the same one or more supply chain entities 140 can act as supplier 142 to supply an item to itself or another one or more supply chain entities 140. Inventory of one or more supply chain entities 140 may be controlled by an inventory system configured to receive and transmit item data, including item identifiers, pricing data, attribute data, inventory levels, and other like data about one or more items at one or more locations in supply chain network 100. Each item may be represented in supply chain network 100 by an identifier, including, for example, Stock-Keeping Unit (SKU), Universal Product Code (UPC), serial number, barcode, tag, a radio-frequency identification (RFID) tag, or like objects that encode identifying information and which may be scanned to read the encoded information and at least partially identified based on the scan. This may include, for example, a stationary scanner located at one or more supply chain entities 140 that scans items as the items pass near the scanner such as, for example, a point of sale system at one or more retailers 148 that records transactions and associates the transactions with product data, including, for example, associating customer identity information, store identity and location, market information, time information, price information, discount information, and the like, as described in more detail herein.

Embodiments also include, for example, a scanner located at one or more stocking locations of one or more supply chain entities 140 that automatically identifies when an item is received into or removed from the one or more stocking locations. In addition, movement of items among one or more supply chain entities 140 may be managed by a transportation management system. According to embodiments, the transportation management system directs one or more transportation vehicles to ship one or more items between one or more supply chain entities 140, based, at least in part, on a supply chain event, order promise failure, service level failure, an inventory policy, target service levels, the number of items currently in stock at one or more supply chain entities 140, the number of items currently in transit in a transportation network, forecasted demand, a supply chain disruption, and/or one or more other factors described herein. Transportation vehicles comprise, for example, any number of trucks, cars, vans, boats, airplanes, unmanned aerial vehicles (UAVs), cranes, robotic machinery, or the like. Transportation vehicles may comprise radio, satellite, or other communication that communicates location information (such as, for example, geographic coordinates, distance from a location, global positioning satellite (GPS) information, or the like) with anomaly detection system 110, the one or more planning and execution systems 120, and/or one or more supply chain entities 140 to identify the location of the transportation vehicle and the location of any inventory or shipment located on the transportation vehicle. Although one example of supply chain network 100 is shown and described, embodiments contemplate any configuration of supply chain network 100, without departing from the scope described herein.

In one embodiment, anomaly detection system 110 may be coupled with network 150 using communication link 162, which may be any wireline, wireless, or other link suitable to support data communications between anomaly detection system 110 and network 150 during operation of supply chain network 100. One or more planning and execution systems 120 may be coupled with network 150 using communication link 164, which may be any wireline, wireless, or other link suitable to support data communications between one or more planning and execution systems 120 and network 150 during operation of supply chain network 100. Computer 130 may be coupled with network 150 using communication link 166, which may be any wireline, wireless, or other link suitable to support data communications between computer 130 and network 150 during operation of supply chain network 100. One or more supply chain entities 140 may be coupled with network 150 using communication link 168, which may be any wireline, wireless, or other link suitable to support data communications between one or more supply chain entities 140 and network 150 during operation of supply chain network 100.

Although the one or more communication links 162-168 are shown as generally coupling anomaly detection system 110, the one or more planning and execution systems 120, one or more supply chain entities 140, and computer 130 to network 150, any of anomaly detection system 110, the one or more planning and execution systems 120, one or more supply chain entities 140, and computer 130 may communicate directly with each other, according to particular needs.

In another embodiment, network 150 includes the Internet and any appropriate local area networks (LANs), metropolitan area networks (MANs), or wide area networks (WANs) coupling anomaly detection system 110, the one or more planning and execution systems 120, one or more supply chain entities 140, and computer 130. For example, data may be maintained locally to, or externally of, anomaly detection system 110, the one or more planning and execution systems 120, one or more supply chain entities 140, and computer 130 and made available to one or more associated users of anomaly detection system 110, the one or more planning and execution systems 120, one or more supply chain entities 140, and computer 130 using network 150 or in any other appropriate manner. For example, data may be maintained in a cloud database at one or more locations external to anomaly detection system 110, the one or more planning and execution systems 120, one or more supply chain entities 140, and computer 130 and made available to one or more associated users of anomaly detection system 110, the one or more planning and execution systems 120, one or more supply chain entities 140, and computer 130 using the cloud or in any other appropriate manner. Those skilled in the art will recognize that the complete structure and operation of network 150 and other components within supply chain network 100 are not depicted or described. Embodiments may be employed in conjunction with known communications networks 150 and other components.

In accordance with the principles of embodiments described herein, anomaly detection system 110 may locate and store potential sales data point anomalies, which represent one or more sales data points associated with local outlier factors that indicates the likelihood that the sales data point is anomalous. Based on the detection and correction of anomalies, a supply chain planner accessing the one or more planning and execution systems 120 may initiate an action to correct a plan or forecast based on the one or more outliers. Based on the selected corrective action, the one or more planning and execution systems 120 may adjust forecasts, inventory levels at various stocking points, production of products of manufacturing equipment, proportional or alternative sourcing of one or more supply chain entities 140, and the configuration and quantity of packaging and shipping of products and taking into account the current inventory or production levels at one or more supply chain entities 140. For example, the selected corrective action to resolve a supply chain forecast or plan based on the detected anomaly may comprise adding items to or removing items from a shipment of one or more supply chain entities 140.

Figure 2:
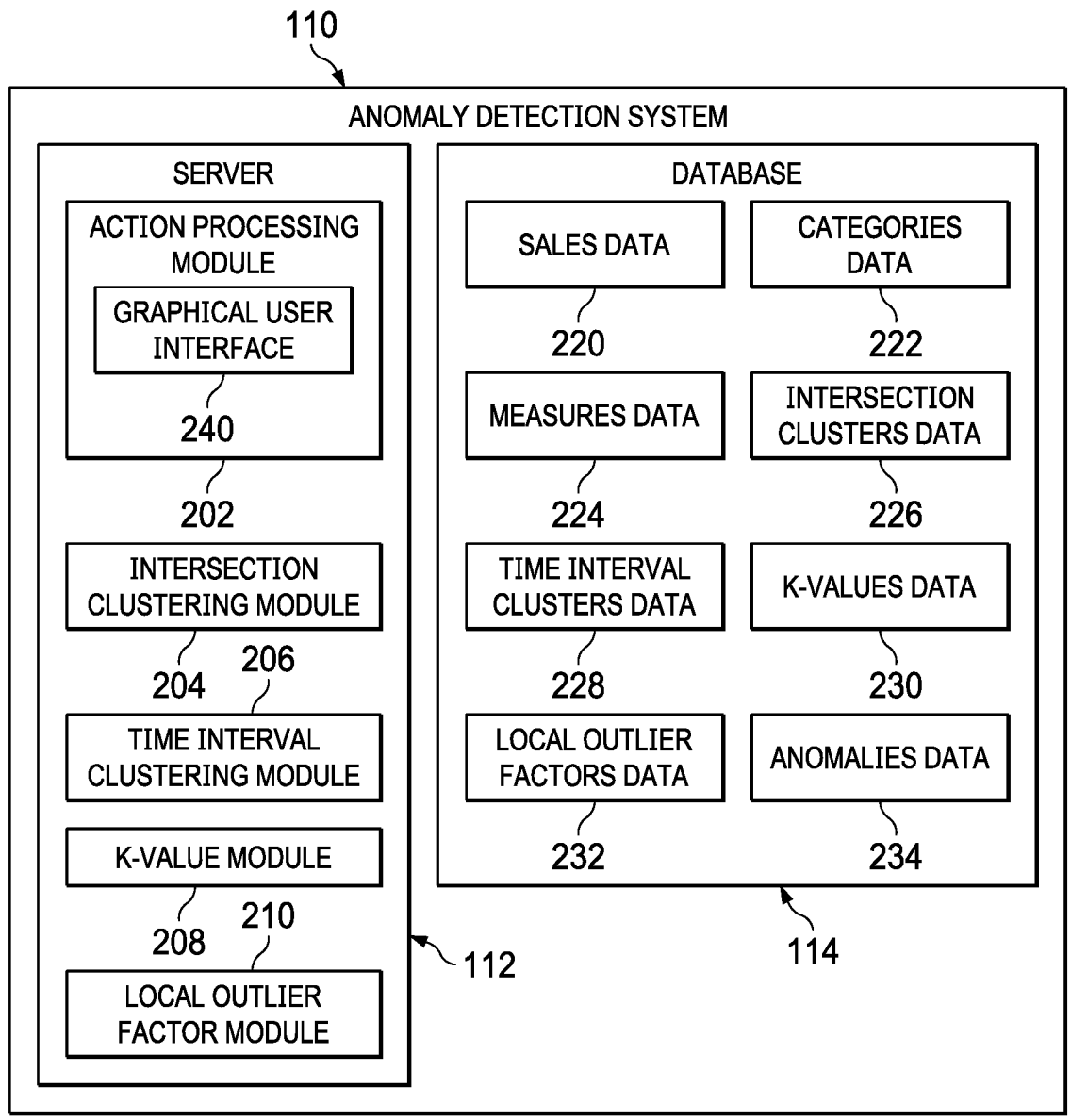
FIG. 2 illustrates the anomaly detection system of FIG. 1 in greater detail, according to an embodiment.

FIG. 2 illustrates anomaly detection system 110 of FIG. 1 in greater detail, according to an embodiment. Anomaly detection system 110 may comprise server 112 and database 114. Although anomaly detection system 110 is shown as comprising a single server 112 and a single database 114, embodiments contemplate any suitable number of servers or databases internal to or externally coupled with anomaly detection system 110 according to particular needs. According to some embodiments, anomaly detection system 110 may be located internal to one or more planning and execution systems 120, computers 130, or supply chain entities 140. In other embodiments, anomaly detection system 110 may be located external to one or more planning and execution systems 120, computers 130, or supply chain entities 140, and may be connected to supply chain network 100 by network 150 and one or more communication links, according to particular needs.

Server 112 of anomaly detection system 110 may comprise action processing module 202, intersection clustering module 204, time interval clustering module 206, K-value module 208, and local outlier factor module 210. Although server 112 is shown and described as comprising action processing module 202, intersection clustering module 204, time interval clustering module 206, K-value module 208, and local outlier factor module 210, embodiments contemplate any suitable number or combination of modules located at one or more locations, local to, or remote from anomaly detection system 110, such as on multiple planning and execution systems 120 or computers 130 at any location in supply chain network 100.

Database 114 of anomaly detection system 110 may comprise one or more databases or other data storage arrangements at one or more locations, local to, or remote from, server 112. Database 114 comprises, for example, sales data 220, categories data 222, measures data 224, intersection clusters data 226, time interval clusters data 228, K-values data 230, local outlier factors data 232, and anomalies data 234. Although database 114 is shown and described as comprising sales data 220, categories data 222, measures data 224, intersection clusters data 226, time interval clusters data 228, K-values data 230, local outlier factors data 232, and anomalies data 234, embodiments contemplate any suitable number or combination of these, located at one or more locations, local to, or remote from, anomaly detection system 110, according to particular needs.

With regard to sever 112, in an embodiment, action processing module 202 receives and processes a user input, such as, for example, input received by input device 132 of one or more computers 130. One or more computers 130 may transmit input to anomaly detection system 110 action processing module 202 using communication links 162 and 166. In an embodiment, action processing module 202 generates one or more graphical user interfaces 240. Graphical user interface 240 may comprise any form of display screen, such as, for example, a series of data tables and HTML, elements displayed on a computer screen. Action processing module 202 may transmit graphical user interface 240 to one or more computers 130 using communication links 162 and 166, and one or more computers 130 may display graphical user interface 240 using display device 134.

Intersection clustering module 204 may access sales data 220, categories data 222, and measures data 224. As described in greater detail below, intersection clustering module 204 may use sales data 220, categories data 222, and measures data 224 to generate one or more intersection clusters that cluster sales data 220 according to trends located in sales data 220 as measured by one or more categories and one or more measures. Each intersection cluster may represent a unique intersection of sales behavior and data as measured by specific category and measure conditions. In an embodiment, intersection clustering module 204 may use one or more elbow methods and/or one or more heuristic methods to generate intersection clusters. Having generated one or more intersection clusters, intersection clustering module 204 stores the intersection clusters in intersection clusters data 226.

According to embodiments, time interval clustering module 206 accesses sales data 220 and intersection clusters data 226. Time interval clustering module 206 uses the sales data stored in sales data 220 and the intersection clusters stored in intersection clusters data 226 to generate one or more time interval clusters associated with each of the one or more intersection clusters, as described in greater detail below. Time interval clusters represent unique behaviors of intersection clusters as measured with respect to a defined time interval (such as, for example, sales occurring across one week, one month, one year, or any other interval of time). By way of example and not by way of limitation, a particular intersection cluster of sales data points may exhibit additional sales trends (identifiable as time interval clusters) when the intersection cluster sales data points are grouped by monthly time intervals (with, for example, additional sales occurring in December, and then tapering off in January). In an embodiment, time interval clusters indicate seasonal sales behavior in one or more intersection clusters, i.e. sales behavior that follows identifiable trends depending on the time of year and/or the season in which the sales take place. Having generated one or more time interval clusters for each of the one or more intersection clusters, time interval clustering module 206 stores the time interval clusters in time interval clusters data 228.

K-value module 208 may access intersection clusters data 226 and time interval clusters data 228. K-value module 208 generates a K-value for each of the sales data points that comprise each intersection cluster based on the number of time interval clusters that time interval clustering module 206 assigned to each intersection cluster. As described in greater detail below, the K-value of a particular intersection cluster defines the locality parameter with which local outlier factor module 210 will calculate the local outlier factor of each sales data point that comprises the intersection cluster. For example, an intersection cluster to which K-value module 208 assigns a K-value of 3 indicates that local outlier factor module 210 will compare each of the sales data points of that intersection cluster to the three (3) nearest neighboring sales data points to calculate the density and local outlier factor of the sales data point. A K-value of 5 indicates that local outlier factor module 210 will compare a particular sales data point to its 5 nearest neighbors, and so on. Having generated a K-value for each intersection cluster, K-value module 208 stores the generated K-values in K-values data 230.

In an embodiment, local outlier factor module 210 accesses sales data 220, intersection clusters data 226, and K-values data 230. As described in greater detail below, local outlier factor module 210 uses the K-value associated with each intersection cluster, and the sales data points that comprise each intersection cluster, to calculate a local outlier factor for each sales data point. In an embodiment, local outlier factor module 210 uses K-values from K-value module 208 and the anomaly detection method LOF (Local Outlier Factor) to measure the deviation of a given sales data point with respect to its neighbors. Having calculated a local outlier factor for each sales data point, local outlier factor module 210 stores the local outlier factors in local outlier factors data 232.

With regard to database 114, sales data 220 comprises records of sales data for one or more items. By way of example only and not by way of limitation, sales data 220 may store, for a body of sales transactions, the dates on which and/or the time interval (such as, for example, the month of the year) in which each transaction occurred, the items, products, or services sold in each transaction, the site at which each transaction occurred, the identities of the selling and buying parties to each transaction, and whether each transaction was conducted under special promotional status or occurred as a standard baseline transaction (collectively, each sales transaction and its associated data may comprise a "sales data point"). Although particular examples of sales data 220 and sales data points are described herein, embodiments contemplate sales data 220 comprising any information related to any number of sales transactions and/or supply chain data, including but not limited to product manufacturing data, according to particular needs. As described in greater detail below, anomaly detection system 110 may display each sales transaction stored in sales data 220 as a single sales data point on one or more graphs, charts, or other renderings displayed on one or more graphical user interfaces 240.

Categories data 222 may comprise data related to one or more sales categories. Categories enable intersection clustering module 204 to organize sales data 220 and to locate one or more trends in sales data 220 for purposes of generating one or more intersection clusters, as described in greater detail below. By way of example only and not by way of limitation, sales data 220 may comprise thousands of individual sales transactions for a food and game arcade restaurant that include a plurality of different products and product categories. In this example, categories data 222 comprises three sales categories: Food, drink, and arcade game sales. Intersection clustering module 204 accesses categories data 222, and uses the three sales categories during the process of creating intersection clusters that group sales data 220 according to one or more trends associated with the three sales categories (such as, for example, increased food sales during the hours of 5-7 pm, and increased drink and arcade game sales during the hours of 7-9 pm). Although particular examples of sales categories stored in categories data 222 are discussed herein, embodiments contemplate categories data 222 storing any form or number of sales categories, according to particular needs.

In an embodiment, measures data 224 may comprise data related to one or more sales measures. Measures provide additional criteria for intersection clustering module 204 to organize sales data 220 and to locate one or more trends in sales data 220 for purposes of generating one or more intersection clusters. For example, in an embodiment, measures stored in measures data 224 may store corrected baseline and promotions data of past sales data 220 which can be categorized as baseline sales and promotional sales: baseline sales (corrected baseline of past data for the sales transactions stored in sales data 220 conducted under normal business conditions) and promotional sales (corrected promotions of past data for the sales transactions stored in sales data 220 conducted under special sales promotion conditions, such as in conjunction with 50% off coupons). Although particular examples of sales measures stored in measures data 224 are discussed herein, embodiments contemplate measures data 224 storing any form or number of sales measures, according to particular needs.

Intersection clusters data 226 may store one or more intersection clusters generated by intersection clustering module 204. According to embodiments, each intersection cluster represents separate intersections of sales behavior and data as measured by specific category and measure conditions. Intersection clusters data 226 may comprise intersection clusters in any configuration and comprising any combination of sales data 220, categories data 222, and measures data 224, according to particular needs.

Time interval clusters data 228 may store one or more time interval clusters generated by time interval clustering module 206. According to embodiments, time interval clusters represent unique behaviors of intersection clusters and the sales data points that comprise intersection clusters as measured with respect to a defined time interval (such as, for example, sales transactions taking place over one week, one month, one year, or any other interval of time). Time interval clusters data 228 may comprise time interval clusters in any configuration and comprising any combination of intersection clusters and one or more time intervals, according to particular needs.

K-values data 230 may store one or more K-values generated by K-value module 208 for one or more intersection clusters. According to embodiments, K-values may comprise any numerical values (such as, for example, 2, 3, 4, 5, or any other number) associated with any number of one or more intersection clusters, according to particular needs.

Local outlier factors data 232 may comprise local outlier factors associated with each transaction stored in sales data 220 and/or each sales data point that action processing module 202 may display on graphical user interface 240. In an embodiment, local outlier factor module 210 generates a local outlier factor for each transaction stored in sales data 220 and/or each sales data point stored in sales data 220, and stores in local outlier factors data 232 the local outlier factors associated with each transaction and/or sales data point. The local outlier factor for each sales data point indicates the distance that separates the sales data point from its neighboring data points, with a higher local outlier factor indicating the sales data point is more distant from its neighboring data points and is more likely to be the product of faulty anomalous data.

Anomalies data 234 stores anomalous sales data points that are not the product of valid supply chain data. As described in greater detail below, anomaly detection system 110 may respond to input from one or more computers 130 indicating that one or more sales data points are anomalous by removing the anomalous sales data point from sales data 220 and storing the anomalous sales data point in anomalies data 234. One or more computers 130 and/or one or more planning and execution systems 120 may access the anomalous sales data points stored in anomalies data 234, and may automatically exclude the anomalous sales data points from supply chain planning processes and forecasts.

Figure 3:
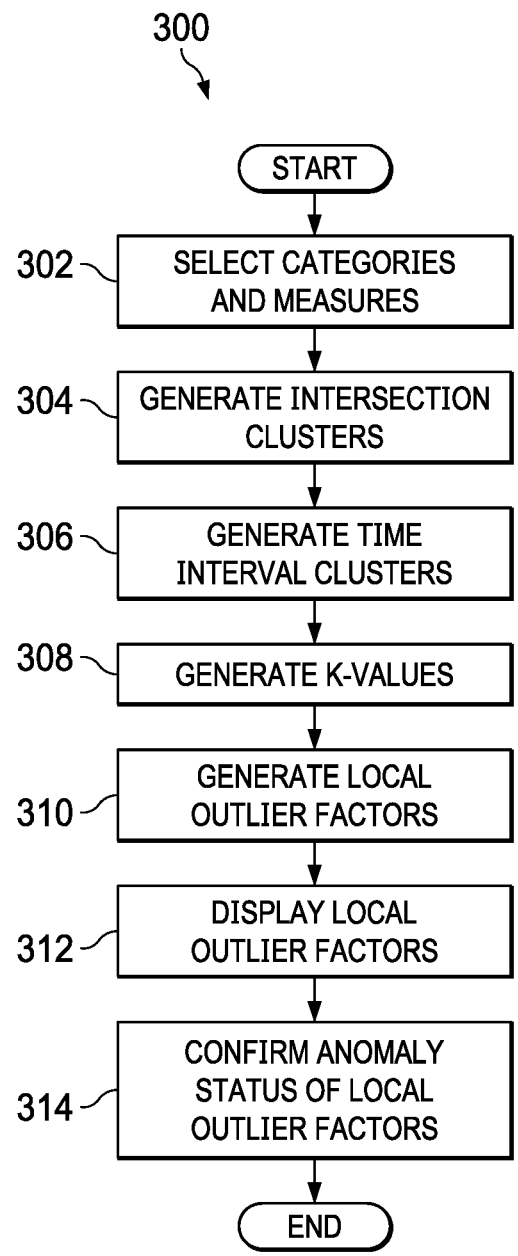
FIG. 3 illustrates an exemplary method of detecting data anomalies, according to an embodiment.

FIG. 3 illustrates exemplary method 300 of detecting data anomalies, according to an embodiment. Anomaly detection system 110 may implement the actions of method 300 to organize sales data into intersection and time interval clusters, assign K-values to the intersection clusters, and conduct a local outlier factor analysis of the sales data points that comprise the intersection clusters to locate one or more anomalies. Although actions of method 300 are described in a particular order, embodiments contemplate anomaly detection system 110 conducting local outlier factor analysis via actions in any suitable order or combination according to particular needs.

At action 302, action processing module 202 selects the categories and measures that anomaly detection system 110 will use to locate one or more data anomalies. In an embodiment, one or more computers 130 may transmit input received by one or more input devices 132 to anomaly detection system 110 action processing module 202 using communication links 162 and 166, selecting one or more categories stored in categories data 222 and one or more measures stored in measures data 224. Having selected one or more categories and one or more measures, action processing module 202 stores the selected categories in categories data 222 and the selected measures in measures data 224.

At action 304, intersection clustering module 204 generates one or more intersection clusters. Intersection clustering module 204 accesses sales data stored in sales data 220, the selected categories stored in categories data 222, and the selected measures stored in measures data 224. Intersection clustering module 204 evaluates the sales data according to the selected categories and measures, and locates one or more trends in the sales data as indicated by the selected categories and measures. Intersection clustering module 204 stores, in the intersection clusters data 226, the one or more located trends as intersection clusters of sales data points.

At action 306, time interval clustering module 206 generates one or more time interval clusters associated with each of the one or more intersection clusters. Time interval clustering module 206 accesses the one or more intersection clusters stored in intersection clusters data 226, and time interval information stored in sales data 220 for each sales data point contained within each intersection cluster. Time interval clustering module 206 uses the intersection clusters and the time interval information to locate time interval trends in the intersection clusters of sales data points, and stores, in time interval clusters data 228, the time interval trends as time interval clusters of sales data points.

At action 308, K-value module 208 generates K-values for each intersection cluster stored in intersection clusters data 226. To do so, K-value module 208 accesses intersection clusters data 226 and time interval clusters data 228. As described in greater detail below, K-value module 208 assigns K-values to each intersection cluster based on the number of time interval clusters that time interval clustering module 206 assigned to each intersection cluster. By way of example only and not by way of limitation, in an embodiment, intersection clustering module 204 generates, at action 304, two intersection clusters (for the purposes of this example, "Intersection Cluster A" comprising all sales in 2018, and "Intersection Cluster B" comprising all sales for the first six (6) months of 2019). Continuing the example, time interval clustering module 206 assigns, at action 306, twelve (12) time interval clusters (in this example, each time interval cluster represents one month of the year) to Intersection Cluster A, and six (6) time interval clusters to Intersection Cluster B. At action 308, K-value module 208 accesses Intersection Cluster A and Intersection Cluster B data stored in intersection clusters data 226, and time interval clusters data for each of Intersection Clusters A and B stored in time interval clusters data 228. In this example, K-value module 208 assigns a K-value of 12 to Intersection Cluster A (because Intersection Cluster A comprises 12 time interval clusters) and a K-value of 6 to Intersection Cluster B (because Intersection Cluster B comprises 6 time interval clusters). Having generated K-values for each intersection cluster, K-value module 208 stores the K-values in K-values data 230. Although particular examples of K-value module 208 generating K-values for intersection clusters are described herein, embodiments contemplate K-value module 208 generating K-values of any magnitude for intersection clusters that comprise any number of time interval clusters, according to particular needs.

At action 310, local outlier factor module 210 generates and assigns a local outlier factor for each sales data point that comprises each interval cluster. According to embodiments, local outlier factor module 210 accesses sales data 220, intersection cluster data 226, and K-values data 230. Local outlier factor module 210 uses the K-values associated with each intersection cluster, and the sales data points that comprise each intersection cluster, to calculate a local outlier factor for each sales data point according to the K-value associated with each intersection cluster. Local outlier factor module 210 averages the local outlier factor calculated for every K-value associated with each sales data point to generate a final averaged local outlier factor for each sales data point in each intersection cluster. In an embodiment, local outlier factor module 210 uses one or more K-values and/or one or more anomaly detection methods to measure the outlier deviation of a given sales data point with respect to its neighbors. Having calculated a local outlier factor for each sales data point, local outlier factor module 210 stores the local outlier factors in local outlier factors data 232. Local outlier factor module 210 ranks the local outlier factors stored in local outlier factors data 232 in descending order of magnitude, with the highest local outlier factor ranked first.

To provide an example of local outlier factor module 210 calculating local outlier factors for sales data points and not by way of limitation, in an embodiment, local outlier factor module 210 accesses sales data 220, K-values data 230, and three intersection clusters stored in intersection clusters data 226 (for the purposes of this example, Intersection Cluster X, comprising 10 sales data points, 3 time interval clusters, and a K-value of 3; Intersection Cluster Y, comprising 5 sales data points, 2 time interval clusters, and a K-value of 2; and Intersection Cluster Z, comprising 8 sales data points, 4 time interval clusters, and a K-value of 4). To generate an averaged final local outlier factor for each of the 23 sales data points across the three Intersection Clusters, in this example, local outlier factor module 210 at action 310 uses local outlier factor algorithm to generate local outlier factors for all three K-values (in this example, 2, 3, and 4) for each of the 23 sales data points. Local outlier factor module 210 averages, for each of the 23 sales data points provided in this example, the local outlier factor calculated with each of the three K-values into an averaged final local outlier factor. Having generated averaged final local outlier factors for each of the 23 sales data points, local outlier factor module 210 stores the local outlier factors in local outlier factor data 232. Local outlier factor module 210 ranks the local outlier factors stored in local outlier factors data 232 in descending order of magnitude.

Figure 8:
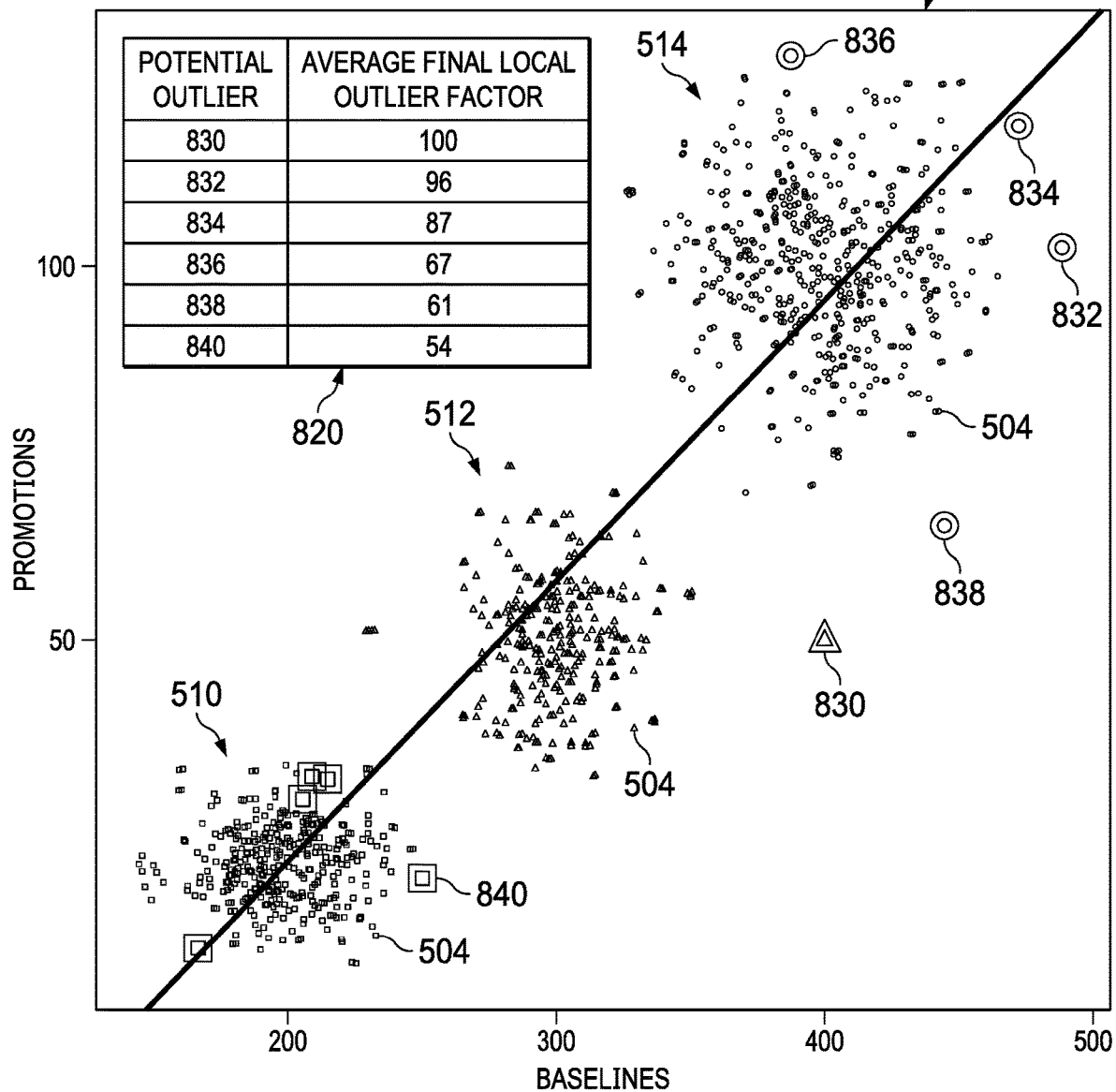
FIG. 8 illustrates an outliers display interface, according to embodiments.

At action 312, action processing module 202 accesses the local outlier factors stored in local outlier factors data 232, and generates graphical user interface 240 displaying the local outlier factors in descending order with the sales data point having the highest local outlier factor listed first. Action processing module 202 may display local outlier factors associated with sales data points in any configuration or graphical representation, according to particular needs. By way of example only and not by way of limitation, action processing module 202 may display local outlier factors associated with sales data points in a table (with the sales data point that comprises the largest local outlier factor ranked first); in other embodiments, action processing module may display a graph of all sales data points rendered as shaded circles, with sales data points comprising larger local outlier factors displayed with correspondingly larger shaded circles, as best illustrated by FIG. 8.

At action 314, one or more computers 130 and/or one or more planning and execution systems 120 may interact with graphical user interface 240 and may confirm the anomaly status of the local outlier factors. In an embodiment, one or more computers 130 may transmit input received by one or more input devices 132 to anomaly detection system 110 action processing module 202 using communication links 162 and 166 to select one or more of the displayed sales data points and local outlier factors and to classify the selected sales data points as "anomalous" or "valid." If one or more computers 130 indicates a sales data point is anomalous, action processing module 202 stores the sales data point and all data associated with the sales data point in anomalies data 234, and removes the sales data point and all associated data from sales data 220. If, on the other hand, one or more computers 130 indicates a sales data point is valid, action processing module 202 removes it from display on graphical user interface 240 and stores data indicating that the sales data point is valid and is not an anomaly in sales data 220. As anomaly detection system 110 executes the actions of method 300 and responds to input at action 314, anomaly detection system 110 develops a list of sales data points that are anomalies and a list of sales data points that are valid outliers, and becomes more likely to locate genuine anomalies (true positives) while avoiding listing valid outlier data points as data anomalies (true negatives). Anomaly detection system 110 proceeds to terminate method 300.

To illustrate the operation of anomaly detection system 110 executing the actions of method 300, the following expanded example is provided. In this example, anomaly detection system 110 executes the actions of method 300 to organize product sales data according to selected categories (in this example, food as a category and ice cream as a sub-category within food) and measures (in this example, baseline and promotion sales), generate intersection clusters and time interval clusters for the sales data, assign K-values to each intersection cluster, and calculate local outlier factors for each sales data point of each intersection cluster. Although anomaly detection system 110 executes the actions of method 300 in a particular order and with particular sales data for the purposes of the following expanded example, embodiments contemplate anomaly detection system 110 implementing the actions of method 300 in any order and with respect to any data, according to particular needs.

FIG. 4 illustrates sales data display interface 402, according to embodiments. In an embodiment, sales data display interface 402 comprises sales data 420. In this example, sales data 420 comprises sales records for a plurality of items sold by a plurality of sellers at a plurality of sites, organized by the month and year in which each transaction occurred and by whether each transaction was sold through a baseline sale or a promotion sale. Although FIG. 4 illustrates sales data display interface 402 in a particular configuration, embodiments contemplate action processing module 202 generating sales data display interface 402 or other graphical user interfaces 240 in any configuration and comprising any number of sales data 220, according to particular needs.

Continuing the example, and at action 302 of method 300, action processing module 202 accesses sales data 420 and generates sales data display interface 402. In this example, computer 130 transmits input received by one or more input devices 132 to action processing module 202 using communication links 162 and 166, selecting one or more categories stored in categories data 222 and one or more measures stored in measures data 224. In this example, computer 130 selects "Food" as the category (which, in this example, further comprises, among other sub-categories, the "Ice cream" sub-category), and "Baseline" and "Promotion" as the two measures, by which anomaly detection system 110 will generate intersection clusters. Having selected the "Food" category and "Baseline" and "Promotion" measures, action processing module 202 stores the selected category in categories data 222 and the selected measures in measures data 224.

Continuing the example, at action 304 of method 300, intersection clustering module 204 accesses sales data 420, the selected "Food" category stored in categories data 222, and the selected "Baseline" and "Promotion" measures stored in measures data 224. Intersection clustering module 204 evaluates sales data 420 according to the selected category and measures, and locates trends in sales data 420 as measured by the selected category and measures (in this example, locating "Baseline" and "Promotion" trends in the sales of Ice Cream products, which occupy a sub-category within the "Food" category). Intersection clustering module 204 stores, in the intersection clusters data 226, the one or more located trends as intersection clusters 510-514 of sales data 420. Action processing module 202 accesses intersection clusters 510-514 stored in intersection clusters data 226, and displays intersection clusters 510-514 on intersection clusters display interface 502, as illustrated below.

Figure 5:
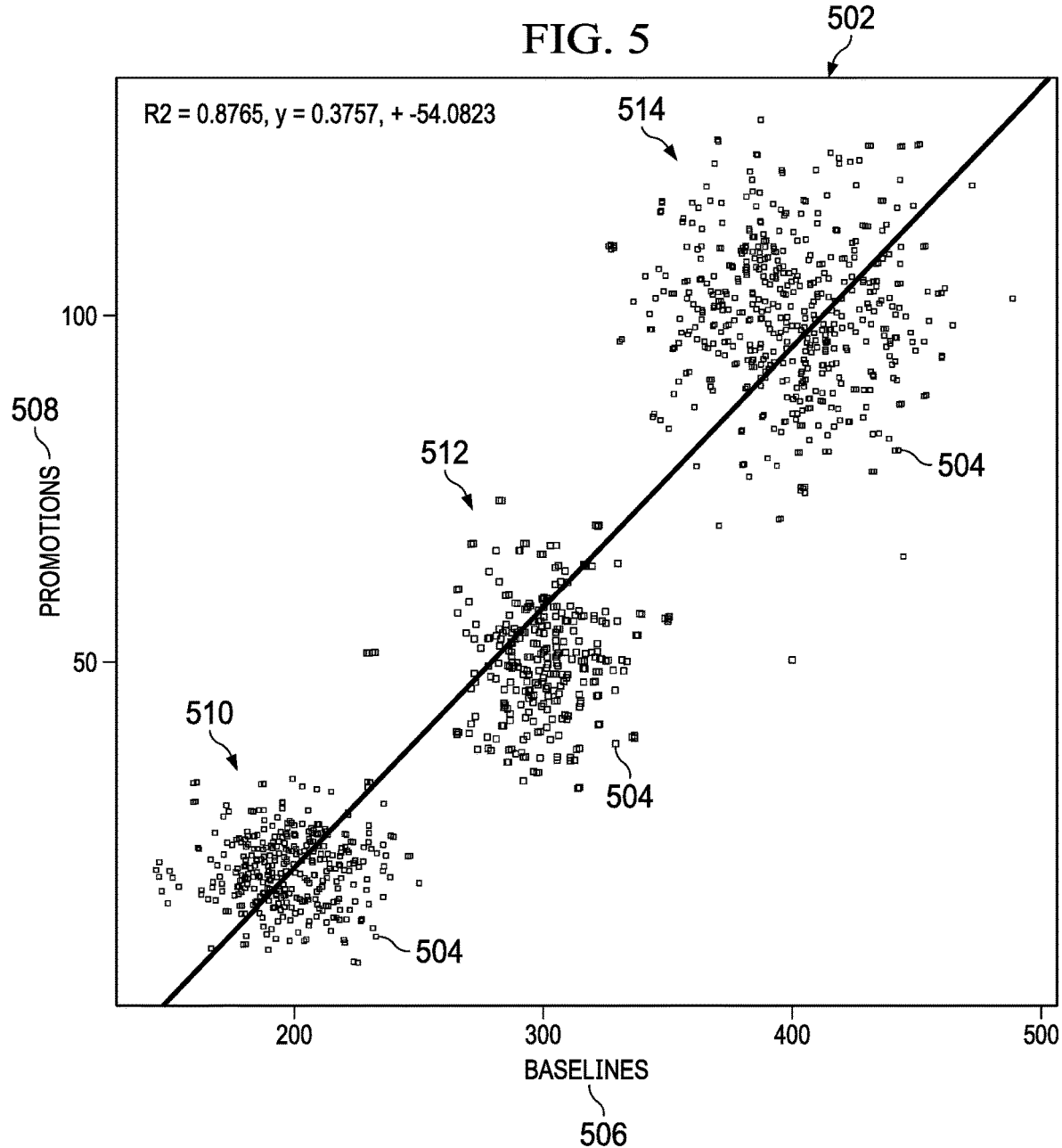
FIG. 5 illustrates an intersection clusters display interface, according to embodiments.

FIG. 5 illustrates intersection clusters display interface 502, according to embodiments. In an embodiment, intersection clusters display interface 502 comprises intersection clusters 510-514, each of which comprises a plurality of sales data points 504. Although FIG. 5 illustrates intersection clusters display interface 502 in a particular configuration, embodiments contemplate action processing module 202 generating intersection clusters display interface 502 or other graphical user interfaces 240 in any configuration and comprising any number of intersection clusters 510-514 and/or sales data points 504 representing sales data 420, according to particular needs.

Continuing the example, each sales data point 504 corresponds to a single sales transaction stored in sales data 420. Action processing module 202 graphs each sales data point 504 on intersection clusters display interface 502 according to the relationship of the sales data point 504 to X-axis baselines measure 506 and Y-axis promotions measure 508. In other embodiments, action processing module 202 may graph sales data points 504 on any X- and Y-axes according to the relationship of sales data points 504 to any categories and/or measures, according to particular needs.

In this example, intersection clustering module 204 generated three intersection clusters 510-514, visible on intersection clusters display interface 502 as three separate clusters of sales data points 504, based on trends in the sales of Ice Cream products located in sales data 420 as measured by the selected "Food" category (which comprises, among other sub-categories, the "Ice Cream" sub-category) and the selected "Baseline" or "Promotion" measures. Winter season cluster 510 displays similar trends in sales data points 504 for products sold during the months of November, December, January, and February. Rainy season cluster 512 displays similar trends in sales data points 504 for products sold during the months of August, September, and October. Summer season cluster 514 displays similar trends in sales data points 504 for products sold during the months of March, April, May, June, and July. Although intersection clusters display interface 502 displays three intersection clusters 510-514, embodiments contemplate intersection clustering module 204 generating, and action processing module 202 displaying, any number of intersection clusters 510-514 on graphical user interfaces 240 of any configuration, according to particular needs.

Continuing the example, at action 306 of method 300, time interval clustering module 206 generates one or more time interval clusters associated with each intersection cluster 510-514. Time interval clustering module 206 accesses winter season cluster 510, rainy season cluster 512, and summer season cluster 514 stored in intersection clusters data 226. Time interval clustering module 206 also accesses time interval information stored in sales data 220 for each sales data point 504 contained within each intersection cluster 510-514. Time interval clustering module 206 uses intersection clusters 510-514 and the time interval information for each sales data point 504 to locate time interval trends in intersection clusters 510-514. In this example, time interval clustering module 206 determines winter season cluster 510 comprises four months. Time interval clustering module 206 assigns four (4) time interval clusters 610, each of which represents one of the four months of November, December, January, and February, to winter season cluster 510. In a similar manner, time interval clustering module 206 assigns three (3) time interval clusters 612 to rainy season cluster 512, and five (5) time interval clusters 614 to summer season cluster 514. Having generated time interval clusters 610-614 for each intersection cluster 510-514, time interval clustering module 206 stores time interval clusters 610-614 in time interval clusters data 228.

Figure 6:
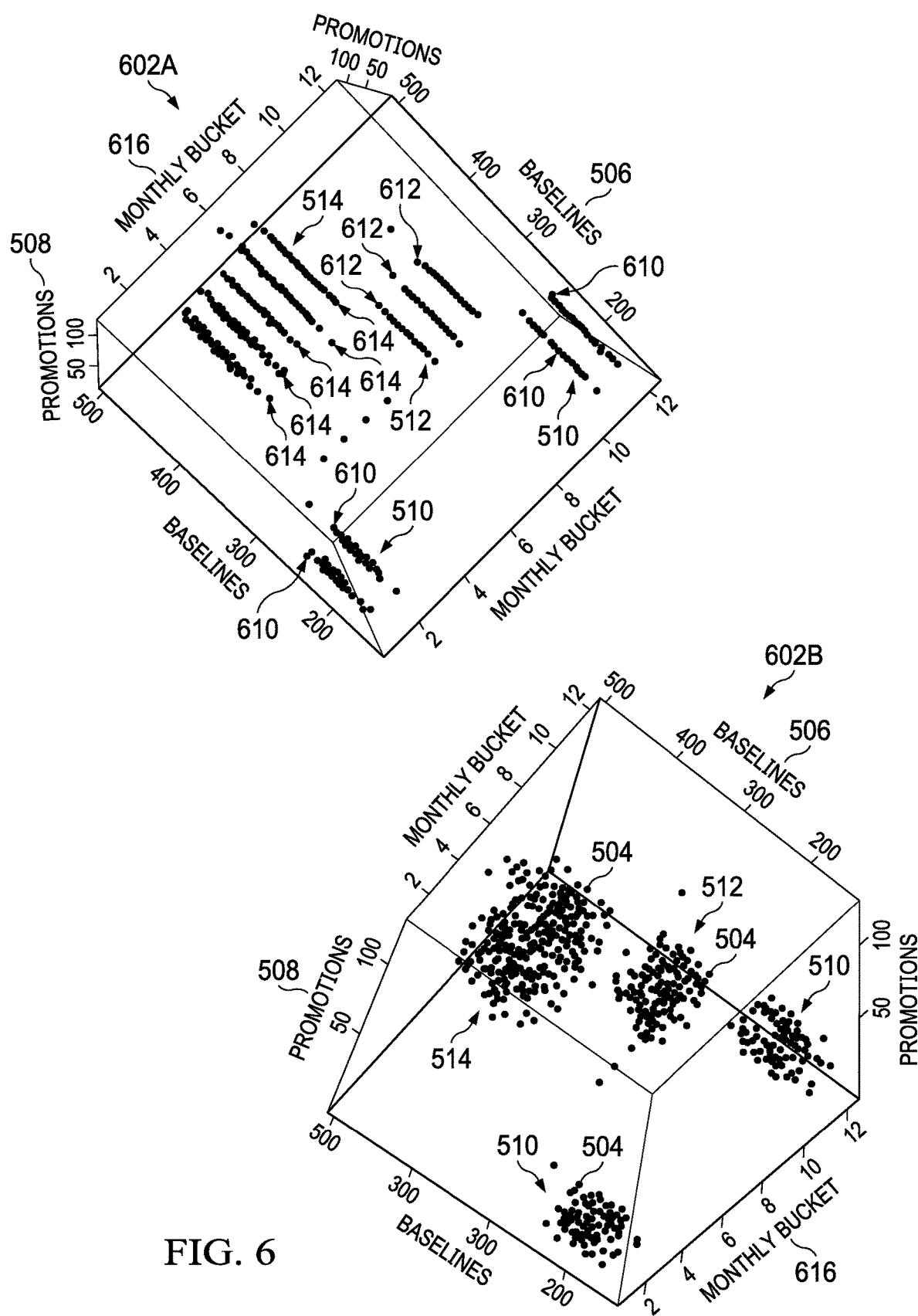
FIG. 6 illustrates time interval clusters display interfaces, according to embodiments.

FIG. 6 illustrates time interval clusters display interfaces 602A and 602B, according to embodiments. In an embodiment, time interval clusters display interfaces 602A and 602B comprise intersection clusters 510-514, each of which comprises a plurality of sales data points 504, and time interval clusters 610-614. Although FIG. 6 illustrates time interval clusters display interfaces 602A and 602B in a particular configuration, embodiments contemplate action processing module 202 generating time interval clusters display interfaces 602A and 602B or other graphical user interfaces 240 in any configuration and comprising any number of sales data points 504 representing sales data 420, according to particular needs.

Continuing the example, time interval clusters display interfaces 602A and 602B represent alternative views of a three-dimensional graph created by action processing module 202 adding the additional dimension of Z-axis time intervals 616 to X-axis baselines measure 506 and Y-axis promotions measure 508. Action processing module 202 may, in response to input from one or more computers 130, rotate and/or zoom time interval clusters display interfaces 602A or 602B to display different views of intersection clusters 510-514 and/or time interval clusters 610-614. Although embodiments illustrate action processing module 202 generating a three-dimensional graph to display intersection clusters 510-514, embodiments contemplate action processing module 202 generating displays of any number of dimensions to visualize any configuration of intersection clusters, time interval clusters, and sales data points, according to particular needs.

At action 308 of method 300, and continuing the example, K-value module 208 generates K-values for each intersection cluster 510-514. K-value module 208 begins by accessing intersection clusters 510-514 stored in intersection clusters data 226 and time interval clusters 610-614 stored in time interval clusters data 228. K-value module 208 assign K-values to each intersection cluster 510-514 based on the number of time interval clusters 610-614 that time interval clustering module 206 assigned to each intersection cluster 510-514 at action 306. In this example, time interval clustering module 206 assigned 4 time interval clusters 610 to winter season cluster 510, 3 time interval clusters 612 to rainy season cluster 512, and 5 time interval clusters 614 to summer season cluster 514. K-value module 208 assigns a K-value of 4 to winter season cluster 510, a K-value of 3 to rainy season cluster 512, and a K-value of 5 to summer season cluster 514. Having generated K-values for each intersection cluster, K-value module 208 stores the K-values in K-values data 230.

Continuing the example, at action 310 of method 300, local outlier factor module 210 calculates local outlier factors for each sales data point 504, using the K-values assigned at action 308. Local outlier factor module 210 accesses sales data 220, K-values data 230, and intersection clusters 510-514 stored in intersection clusters data 226 (in this example, winter season cluster 510 comprising 4 time interval clusters 610 and a K-value of 4; rainy season cluster 512 comprising 3 time interval clusters 612 and a K-value of 3; and summer season cluster 514 comprising 5 time interval clusters 514 and a K-value of 5). To generate an averaged final local outlier factor for each sales data point 504 associated with each intersection cluster 510-514, local outlier factor module 210 at action 310 uses a local outlier factor algorithm to generate local outlier factors for all three K-values (in this example, 3, 4, and 5) for each sales data point 504. Local outlier factor module 210 averages, for each sales data point 504, the three local outlier factors calculated with each of the three K-values (3, 4, and 5) into an averaged final local outlier factor. Having generated averaged final local outlier factors for each sales data point 504, local outlier factor module 210 stores the local outlier factors in local outlier factors data 232. Local outlier factor module 210 ranks the local outlier factors stored in local outlier factors data 232 in descending order of magnitude.

Figure 7:
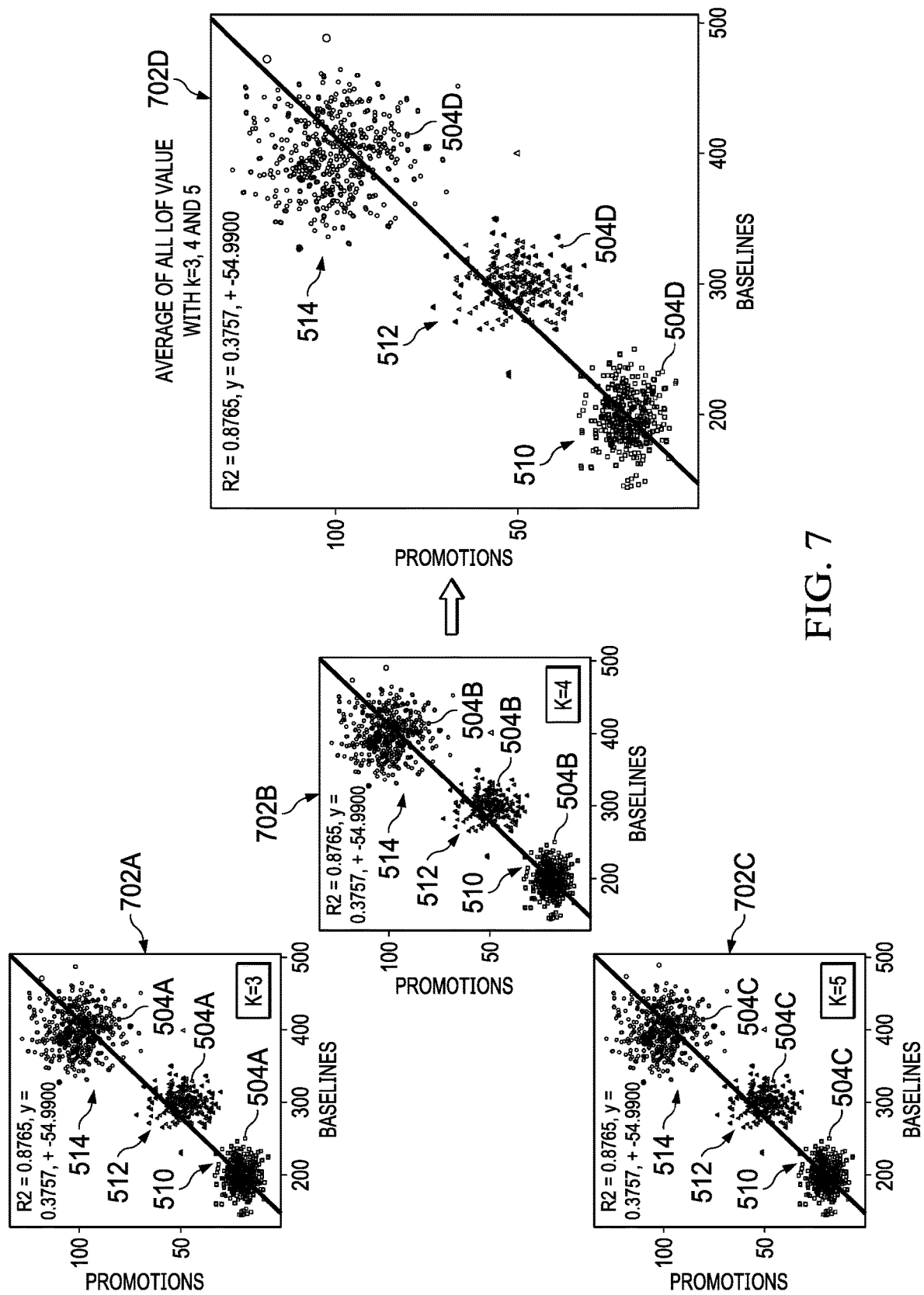
FIG. 7 illustrates a plurality of K-value display interfaces, according to embodiments.

FIG. 7 illustrates a plurality of K-value display interfaces 702A-702D, according to embodiments. K-value display interfaces 702A-702D comprise intersection clusters 510-514, each of which comprising a plurality of sales data points 504. Although FIG. 7 illustrates K-value display interfaces 702A-702D in a particular configuration, embodiments contemplate action processing module 202 generating K-value display interfaces 702A-702D or other graphical user interfaces 240 in any configuration and comprising any number of sales data points 504 representing sales data 420, according to particular needs.

Continuing the example, and according to embodiments, action processing module 202 generates K-value display interface 702A to display local outlier factors for each sales data point 504A as calculated by K-value module 208 using a K-value of 3. In this embodiment, the size of the shaded circle of each sales data point 504A displayed on K-value display interface 702A indicates the magnitude of the local outlier factor of sales data point 504A as calculated by K-value module 208 using a K-value of 3. K-value display interface 702B displays local outlier factors for each sales data point 504B as calculated by K-value module 208 using a K-value of 4. K-value display interface 702C displays local outlier factors for each sales data point 504C as calculated by K-value module 208 using a K-value of 5. K-value display interface 702D displays averaged final local outlier factors for each sales data point 504D as calculated by K-value module 208 averaging the previous three local outlier factors for each sales data point 504D (local outlier factors calculated using K-values of 3, 4, and 5).

At action 312 of method 300, and continuing the example, action processing module 202 accesses the local outlier factors of each sales data point 504 stored in local outlier factors data 232, and generates outliers display interface 802 displaying the six highest-magnitude local outlier factors in descending order with sales data point 504 having the highest local outlier factor listed first.

FIG. 8 illustrates outliers display interface 802, according to embodiments. In an embodiment, outliers display interface 802 comprises intersection clusters 510-514, each of which comprising a plurality of sales data points 504, potential outlier table 820, and potential outliers 830-840. Although FIG. 8 illustrates outliers display interface 802 in a particular configuration, embodiments contemplate action processing module 202 generating outliers display interfaces 802 or other graphical user interfaces 240 in any configuration, according to particular needs.

Continuing the example, and as illustrated by FIG. 8, potential outlier table 820 displays, in this embodiment, the six sales data points 504 (in this example, potential outliers 830-840) to which local outlier factor module 210 assigned the six highest average final local outlier factors at action 310. Action processing module 202 displays potential outlier 830, which comprises an average final local outlier factor of 100, at the top of potential outlier table 820, indicating potential outlier 830 is the sales data point 504 with the greatest-magnitude average final local outlier factor out of all sales data points 504, and is therefore most likely to be a faulty data anomaly and not the product of accurate data. Action processing module displays remaining potential outliers 832-840 in descending order of magnitude. Although FIG. 8 illustrates action processing module 202 generating potential outlier table 820 displaying six potential outliers 830-840, embodiments contemplate action processing module 202 generating potential outlier tables 820 of any length and/or displaying any number of potential outlier sales data points 504, according to particular needs.

At action 314 of method 300, and concluding the example, computer 130 interacts with outliers display interface 802 and selects potential outliers 830, 832, and 834 as data anomalies, and potential outliers 836, 838, and 840 as valid data points. Action processing module 202 stores potential outliers 830-834 and all data associated with potential outliers 830-834 in anomalies data 234, and the sales data points 504 associated with potential outliers 830-834 from sales data 220. Similarly, action processing module 202 removes potential outliers 836-840 from potential outlier table 820 and stores data indicating that the sales data points 504 associated with potential outliers 836-838 are valid and are not data anomalies in sales data 220. Anomaly detection system 110 proceeds to terminate method 300.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. An anomaly detection system, comprising:
   a supply chain network comprising two or more supply chain entities; and
   a computer coupled with a database and comprising a processor and memory, the computer configured to locate and correct one or more data anomalies in supply chain data by:
   receiving supply chain data comprising a plurality of data points, wherein the supply chain data is based at least in part on data received from one or more transportation vehicles and wherein the received data identifies a corresponding one or more locations of the one or more transportation vehicles and a location of any inventory or shipment on the one or more transportation vehicles;
   selecting categories and measures by which to cluster the supply chain data;
   clustering the data points into intersection clusters as measured by the selected categories and measures by:
   generating optimal K-values for the plurality of data points in relation to a number of time interval clusters, wherein each optimal K-value defines a locality parameter;
   generating local outlier factors for the plurality of data points using the optimal K-values, wherein each local outlier factor is based, at least in part, on a corresponding locality parameter; and
   ranking the local outlier factors in descending order of magnitude;
   correcting a supply chain plan based on at least one detected anomaly associated with the ranked local outlier factors; and
   instructing an automated distribution system to automatically transport one or more products based on the corrected supply chain plan.

2. The system of claim 1, wherein the supply chain data further comprises one or more records of sales data, the one or more records of sales data further comprising one or more of:
   a date on which each transaction occurred;
   a time interval in which each transaction occurred;
   one or more items, products or services sold in each transaction;
   a site at which each transaction occurred;
   identities of selling and buying parties to each transaction; and
   whether each transaction was conducted under special promotional status or occurred as a standard baseline transaction.

3. The system of claim 1, wherein the supply chain data further comprises data related to one or more sales categories.

4. The system of claim 1, wherein the computer is further configured to locate and correct one or more data anomalies in supply chain data by:
   directing the one or more transportation vehicles to ship one or more items between one or more supply chain entities, based, at least in part, on one or more of:
   a supply chain event, an order promise failure, a service level failure, an inventory policy, one or more target service levels, a number of items currently in stock at one or more supply chain entities, a number of items currently in transit in a transportation network, a forecasted demand and a supply chain disruption.

5. The system of claim 1, wherein the data received from the one or more transportation vehicles further comprises one or more of:
   radio, satellite, or other communication that communicates location information comprising geographic coordinates, distance from a location and global positioning satellite information.

6. The system of claim 1, wherein correcting the supply chain plan comprises one or more of:
   adjusting one or more forecasts, adjusting one or more inventory levels at one or more stocking points, adjusting production of one or more products, adjusting proportional or alternative sourcing of one or more supply chain entities, adjusting a configuration and quantity of packaging and shipping of products and accounting for current inventory levels or production levels at one or more supply chain entities.

7. The system of claim 1, wherein the optimal K-values are generated based on an elbow method.

8. A computer-implemented method, comprising:
   receiving, from a supply chain network comprising two or more supply chain entities and a computer comprising a processor and memory and coupled to a database, supply chain data comprising a plurality of data points, wherein the supply chain data is based at least in part on data received from one or more transportation vehicles and wherein the received data identifies a corresponding one or more locations of the one or more transportation vehicles and a location of any inventory or shipment on the one or more transportation vehicles;
   selecting categories and measures by which to cluster the supply chain data;
   clustering the data points into intersection clusters as measured by the selected categories and measures by:
   generating optimal K-values for the plurality of data points in relation to a number of time interval clusters, wherein each optimal K-value defines a locality parameter;
   generating local outlier factors for the plurality of data points using the optimal K-values, wherein each local outlier factor is based, at least in part, on a corresponding locality parameter; and
   ranking the local outlier factors in descending order of magnitude;
   correcting a supply chain plan based on at least one detected anomaly associated with the ranked local outlier factors; and
   instructing an automated distribution system to automatically transport one or more products based on the corrected supply chain plan.

9. The method of claim 8, wherein the supply chain data further comprises one or more records of sales data, the one or more records of sales data further comprising one or more of:
- a date on which each transaction occurred;
- a time interval in which each transaction occurred;
- one or more items, products or services sold in each transaction;
- a site at which each transaction occurred;
- identities of selling and buying parties to each transaction; and
- whether each transaction was conducted under special promotional status or occurred as a standard baseline transaction.

10. The method of claim 8, wherein the supply chain data further comprises data related to one or more sales categories.

11. The method of claim 8, further comprising:
- directing the one or more transportation vehicles to ship one or more items between one or more supply chain entities, based, at least in part, on one or more of:
  - a supply chain event, an order promise failure, a service level failure, an inventory policy, one or more target service levels, a number of items currently in stock at one or more supply chain entities, a number of items currently in transit in a transportation network, a forecasted demand and a supply chain disruption.

12. The method of claim 8, wherein the data received from the one or more transportation vehicles further comprises one or more of:
- radio, satellite, or other communication that communicates location information comprising geographic coordinates, distance from a location and global positioning satellite information.

13. The method of claim 8, wherein correcting the supply chain plan comprises one or more of:
- adjusting one or more forecasts, adjusting one or more inventory levels at one or more stocking points, adjusting production of one or more products, adjusting proportional or alternative sourcing of one or more supply chain entities, adjusting a configuration and quantity of packaging and shipping of products and accounting for current inventory levels or production levels at one or more supply chain entities.

14. The method of claim 8, wherein the optimal K-values are generated based on an elbow method.

15. A non-transitory computer-readable storage medium embodied with software, the software when executed configured to:
- access supply chain data comprising a plurality of data points from a supply chain network, the supply chain network comprising two or more supply chain entities and a computer coupled with a database and comprising a processor and memory, wherein the supply chain data is based at least in part on data received from one or more transportation vehicles and wherein the received data identifies a corresponding one or more locations of the one or more transportation vehicles and a location of any inventory or shipment on the one or more transportation vehicles;
- select categories and measures by which to cluster the supply chain data;
- cluster the data points into intersection clusters as measured by the selected categories and measures by:
  - generating optimal K-values for the plurality of data points in relation to a number of time interval clusters, wherein each optimal K-value defines a locality parameter;
  - generate local outlier factors for the plurality of data points using the optimal K-values, wherein each local outlier factor is based, at least in part, on a corresponding locality parameter; and
  - rank the local outlier factors in descending order of magnitude;
- correct a supply chain plan based on at least one detected anomaly associated with the ranked local outlier factors; and
- instruct an automated distribution system to automatically transport one or more products based on the corrected supply chain plan.

16. The non-transitory computer-readable storage medium of claim 15, wherein the supply chain data further comprises one or more records of sales data, the one or more records of sales data further comprising one or more of:
- a date on which each transaction occurred;
- a time interval in which each transaction occurred;
- one or more items, products or services sold in each transaction;
- a site at which each transaction occurred;
- identities of selling and buying parties to each transaction; and
- whether each transaction was conducted under special promotional status or occurred as a standard baseline transaction.

17. The non-transitory computer-readable storage medium of claim 15, wherein the supply chain data further comprises data related to one or more sales categories.

18. The non-transitory computer-readable storage medium of claim 15, wherein the software when executed is further configured to locate and correct one or more data anomalies in supply chain data by:
- directing the one or more transportation vehicles to ship one or more items between one or more supply chain entities, based, at least in part, on one or more of:
  - a supply chain event, an order promise failure, a service level failure, an inventory policy, one or more target service levels, a number of items currently in stock at one or more supply chain entities, a number of items currently in transit in a transportation network, a forecasted demand and a supply chain disruption.

19. The non-transitory computer-readable storage medium of claim 15, wherein the data received from the one or more transportation vehicles further comprises one or more of:
- radio, satellite, or other communication that communicates location information comprising geographic coordinates, distance from a location and global positioning satellite information.

20. The non-transitory computer-readable storage medium of claim 15, wherein correcting the supply chain plan comprises one or more of:
- adjusting one or more forecasts, adjusting one or more inventory levels at one or more stocking points, adjusting production of one or more products, adjusting proportional or alternative sourcing of one or more supply chain entities, adjusting a configuration and quantity of packaging and shipping of products and accounting for current inventory levels or production levels at one or more supply chain entities.

* * * * *